United States Patent
Sha

(10) Patent No.: US 9,817,522 B2
(45) Date of Patent: Nov. 14, 2017

(54) TOUCH SCREEN AND TOUCH POINT POSITIONING METHOD

(71) Applicants: BOE TECHNOLOGY GROUP CO., LTD., Beijing (CN); HEFEI XINSHENG OPTOELECTRONICS TECHNOLOGY CO., LTD, Anhui (CN)

(72) Inventor: Jin Sha, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 274 days.

(21) Appl. No.: 14/646,088

(22) PCT Filed: Jan. 5, 2015

(86) PCT No.: PCT/CN2015/070111
§ 371 (c)(1),
(2) Date: May 20, 2015

(87) PCT Pub. No.: WO2016/045245
PCT Pub. Date: Mar. 31, 2016

(65) Prior Publication Data
US 2016/0259441 A1  Sep. 8, 2016

(30) Foreign Application Priority Data
Sep. 24, 2014 (CN) .......................... 2014 1 0493830

(51) Int. Cl.
G06F 3/041 (2006.01)
G06F 3/043 (2006.01)
G06F 1/32 (2006.01)

(52) U.S. Cl.
CPC ............ *G06F 3/043* (2013.01); *G06F 1/3262* (2013.01); *G06F 3/0412* (2013.01); *G06F 3/0416* (2013.01); *G06F 3/0436* (2013.01)

(58) Field of Classification Search
CPC .......................................... G06F 3/043–3/0436
See application file for complete search history.

(56) References Cited

U.S. PATENT DOCUMENTS

2010/0302211 A1* 12/2010 Huang .................... G06F 3/043
345/177
2011/0242055 A1* 10/2011 Kim ........................ G06F 3/042
345/175
(Continued)

FOREIGN PATENT DOCUMENTS

CN      1199889 A      11/1998
CN      101512550 A    8/2009
(Continued)

OTHER PUBLICATIONS

International Patent Application No. PCT/CN2015/070111, International Search report dated Mar. 3, 2015, twelve (12) pages.
(Continued)

*Primary Examiner* — William Boddie
*Assistant Examiner* — Jeffrey A Parker
(74) *Attorney, Agent, or Firm* — Nath, Goldberg & Meyer; Joshua B. Goldberg

(57) ABSTRACT

A touch screen and a touch point positioning method are disclosed. The touch screen comprises a display panel and a touch point positioning device, the touch point positioning device comprises a timing unit, a calculating unit and n receiving units, the receiving units are provided in edge areas of the display panel, the receiving units are connected with the timing unit, and the timing unit is connected with the calculating unit. According to technical solutions of the present invention, the receiving units receive an acoustic wave signal generated at a touch point when the display panel is touched, the timing unit records reception times when the receiving units receive the acoustic wave signal, and the calculating unit calculates a position coordinate of
(Continued)

the touch point on the display panel according to the reception times of the receiving units recorded by the timing unit, thus achieving positioning of the touch point.

8 Claims, 2 Drawing Sheets

(56) References Cited

U.S. PATENT DOCUMENTS

2012/0154110 A1    6/2012  Kim et al.
2013/0113760 A1*   5/2013  Gossweiler, III ..... G06F 3/0433
                                                        345/177

FOREIGN PATENT DOCUMENTS

| CN | 101644978 A | 2/2010 |
| CN | 101916153 A | 12/2010 |
| CN | 103593093 A | 2/2014 |

OTHER PUBLICATIONS

International Patent Application No. PCT/CN2015/070111, English translation of Written Opinion of the International Searching Authority and International Search Report dated Mar. 3, 2015, twelve (12) pages.
Office Action dated Oct. 17, 2016 issued in corresponding Chinese Application No. 201410493830.2.

* cited by examiner

TOUCH SCREEN AND TOUCH POINT POSITIONING METHOD

FIELD OF THE INVENTION

The present invention relates to the field of display technology, and particularly relates to a touch screen and a touch point positioning method.

BACKGROUND OF THE INVENTION

A surface acoustic wave type touch screen has become a mainstream touch screen currently due to the characteristics of high resolution, short response time, good stability, good explosion resistance, good transparency, etc.

In the prior art, the surface acoustic wave touch screen comprises two transmitting transducers, two receiving transducers and two groups of reflective stripe arrays, an acoustic generator transmits through the transmitting transducers a high frequency acoustic wave capable of crossing the surface of the touch screen, but when a finger touches the touch screen, the high frequency acoustic wave is blocked at the touch point, and a coordinate position of the touch point is determined thereby.

However, during actual use, the surface acoustic wave touch screen in the prior art has the following shortcomings: first, the two groups of reflective stripe arrays will greatly affect the display effect of the touch screen during a display process; second, the two transmitting transducers continuously emit high frequency acoustic waves, resulting in relatively high overall power consumption of the touch screen.

SUMMARY OF THE INVENTION

The present invention provides a touch screen and a touch point positioning method, by means of which a touch point on a display panel can be effectively positioned.

To achieve the above object, the present invention provides a touch screen, comprising a display panel and a touch point positioning device, the touch point positioning device comprises a timing unit, a calculating unit and n receiving units, where n≥3, the receiving units are provided in edge areas of the display panel, the receiving units are connected with the timing unit, the timing unit is connected with the calculating unit, the receiving units are used for receiving an acoustic wave signal generated at a touch point when the display panel is touched, the timing unit is used for recording reception times when the receiving units receive the acoustic wave signal, and the calculating unit is used for calculating a position coordinate of the touch point on the display panel according to the reception times of the receiving units recorded by the timing unit.

Optionally, the timing unit is started when any receiving unit in all the receiving units receives the acoustic wave signal, is closed when all the receiving units receive the acoustic wave signal, and records the corresponding reception time of the receiving unit receiving the acoustic wave signal first as an initial time.

Optionally, the positioning device further comprises a counting unit, the counting unit is connected with the timing unit and the receiving units, the counting unit is used for counting the number of the receiving unit(s) receiving the acoustic wave signal; when the count value in the counting unit is 1, the counting unit generates and sends a timing start signal to the timing unit, and when the count value in the counting unit is n, the counting unit generates and sends a timing termination signal to the timing unit, and the counting unit resets the count value; and the timing unit is started when receiving the timing start signal and is closed when receiving the timing termination signal.

Optionally, the touch point positioning device further comprises a storage unit, the storage unit is connected with the calculating unit, and the storage unit is used for pre-storing position coordinates of a plurality of reference positions on the display panel and corresponding reception times of the receiving units when the reference positions are touched; the calculating unit comprises a time coordinate generating module and a calculating module; the time coordinate generating module is connected with the calculating module; the time coordinate generating module is used for generating a corresponding reception time coordinate of the touch point in an n-dimensional coordinate system according to the reception times of the receiving units recorded by the timing unit and according to a preset arrangement sequence of the receiving units, and generating corresponding reception time coordinates of the reference positions in the n-dimensional coordinate system according to the corresponding reception times of the receiving units when the reference positions are touched stored in the storage unit and according to the preset arrangement sequence of the receiving units; and the calculating module is used for respectively calculating Euclidean distances between the reference positions and the touch point according to the reception time coordinate of the touch point and the reception time coordinates of the reference positions in the n-dimensional coordinate system, and determining a reference position at a minimum Euclidean distance from the touch point, so as to determine the position coordinate of the touch point on the display panel as the position coordinate corresponding to the reference position at the minimum Euclidean distance from the touch point.

Optionally, the receiving units are piezoelectric sensors, the piezoelectric sensors are used for generating corresponding electrical signals when receiving the acoustic wave signal, and sending the electrical signals to the timing unit, and the timing unit sequentially receives the electrical signals generated by the piezoelectric sensors and records the corresponding reception times of the receiving units receiving the acoustic wave signal according to the received electrical signals.

Optionally, three receiving units are provided, and the three receiving units are not located on a same straight line.

Optionally, four receiving units are provided, the display panel has a rectangular shape, and the four receiving units are respectively located at the midpoints of the four sides of the display panel.

To achieve the above object, the present invention further provides a touch point positioning method of a touch screen, the touch screen comprising a display panel, a timing unit, a calculating unit and n receiving units, where n≥3, the receiving units being provided in edge areas of the display panel, the receiving units being connected with the timing unit, and the timing unit being connected with the calculating unit, the touch point positioning method comprises: receiving, by the receiving units, an acoustic wave signal generated at a touch point when the display panel is touched; recording, by the timing unit, reception times when the receiving units receive the acoustic wave signal; and calculating, by the calculating unit, a position coordinate of the touch point on the display panel according to the reception times of the receiving units recorded by the timing unit.

Optionally, the timing unit is started when any receiving unit in all the receiving units receives the acoustic wave signal, is closed when all the receiving units receive the acoustic wave signal, and records the corresponding reception time of the receiving unit receiving the acoustic wave signal first as an initial time.

Optionally, the touch point positioning device further comprises a storage unit, the storage unit is connected with the calculating unit; prior to the step of receiving, by the receiving units, an acoustic wave signal generated at a touch point when the display panel is touched, the touch point positioning method further comprises: pre-storing, by the storage unit, position coordinates of a plurality of reference positions on the display panel and corresponding reception times of the receiving units when the reference positions are touched; the calculating unit comprises a time coordinate generating module and a calculating module, the time coordinate generating module is connected with the calculating module; the step of calculating, by the calculating unit, the position coordinate of the touch point on the display panel according to the reception times of the receiving units recorded by the timing unit comprises: generating, by the time coordinate generating module, a corresponding reception time coordinate of the touch point in an n-dimensional coordinate system according to the reception times of the receiving units recorded by the timing unit and according to a preset arrangement sequence of the receiving units, and generating corresponding reception time coordinates of the reference positions in the n-dimensional coordinate system according to the corresponding reception times of the receiving units when the reference positions are touched stored in the storage unit and according to the preset arrangement sequence of the receiving units; respectively calculating Euclidean distances between the reference positions and the touch point according to the reception time coordinate of the touch point and the reception time coordinates of the reference positions in the n-dimensional coordinate system, and determining a reference position at a minimum Euclidean distance from the touch point, by the calculating module, so as to determine the position coordinate of the touch point on the display panel as the position coordinate corresponding to the reference position at the minimum Euclidean distance from the touch point.

The present invention provides a touch screen and a touch point positioning method. The touch screen comprises a timing unit, a calculating unit and n receiving units, the receiving units are provided in edge areas of the display panel, the receiving units are connected with the timing unit, and the timing unit is connected with the calculating unit. According to the technical solutions of the present invention, the receiving units receive an acoustic wave signal generated at a touch point when the display panel is touched, the timing unit records reception times when the receiving units receive the acoustic wave signal, and the calculating unit calculates a position coordinate of the touch point on the display panel according to the reception times of the receiving units recorded by the timing unit, thus achieving positioning of the touch point. In addition, the touch screen is relatively low in overall power consumption and is wide in application range.

DETAILED DESCRIPTION OF THE EMBODIMENTS

In order that those skilled in the art can better understand the technical solutions of the present invention, the touch screen and the touch point positioning method provided by the present invention will be described below in detail in conjunction with accompanying drawings.

First Embodiment

Figure 1:
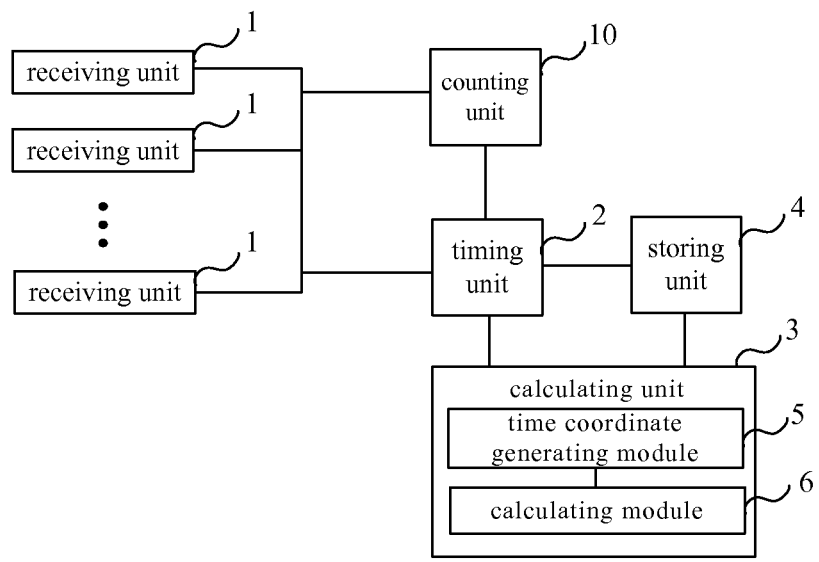
FIG. 1 is a schematic diagram of a structure of a touch point positioning device of a touch screen in a first embodiment of the present invention.
Figure 2:
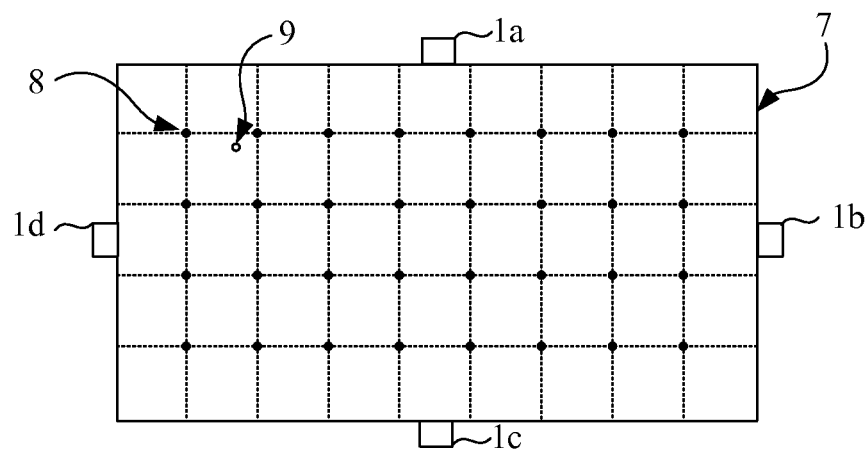
FIG. 2 is a schematic diagram of a principle of touch point positioning of the touch screen in the first embodiment of the present invention.

FIG. 1 is a schematic diagram of a structure of a touch point positioning device of a touch screen in the first embodiment of the present invention. FIG. 2 is a schematic diagram of principle of touch point positioning of the touch screen in the first embodiment of the present invention. As shown in FIGS. 1 and 2, the touch screen comprises a display panel 7 and a touch point positioning device. The touch point positioning device comprises a timing unit 2, a calculating unit 3 and n receiving units 1, where n≥3, the receiving units 1 are provided in edge areas of the display panel 7, the receiving units 1 are connected with the timing unit 2, the timing unit 2 is connected with the calculating unit 3, the receiving units 1 are used for receiving an acoustic wave signal generated at a touch point 9 when the display panel 7 is touched, the timing unit 2 is used for recording reception times when the receiving units 1 receive the acoustic wave signal, and the calculating unit 3 is used for calculating a position coordinate of the touch point 9 on the display panel 7 according to the reception times of the receiving units 1 recorded by the timing unit 2.

It should be noted herein that, when the display panel 7 is touched, corresponding vibration is generated at the position of the touch point 9 on the display panel 7, thereby generating the corresponding acoustic wave signal.

Optionally, the timing unit 2 is started when any receiving unit 1 in all the receiving units 1 receives the acoustic wave signal, and is closed when all the receiving units 1 receive the acoustic wave signal. Further optionally, the touch point positioning device further comprises a counting unit 10, the counting unit 10 is connected with the timing unit 2 and the receiving units 1. The counting unit 10 is used for counting the number of the receiving unit(s) 1 receiving the acoustic wave signal. When the count value in the counting unit 10 is 1, the counting unit 10 generates and sends a timing start signal to the timing unit 2. When the count value in the counting unit 10 is n, the counting unit 10 generates and sends a timing termination signal to the timing unit 2, and the counting unit 10 resets the count value. The timing unit 2 is started when receiving the timing start signal and is closed when receiving the timing termination signal. During a timing process, the timing unit 2 records the corresponding reception time of the receiving unit 1 receiving the acoustic wave signal first as an initial time, which is assumed to be 0 in the embodiment, and then sequentially records reception times when other receiving units 1 receive the acoustic wave signal.

Optionally, the touch point positioning device further comprises a storage unit 4, the storage unit 4 is connected with the calculating unit 3, and the storage unit 4 is used for pre-storing position coordinates of a plurality of reference positions 8 on the display panel 7 and corresponding reception times of the receiving units 1 when the reference positions 8 are touched.

In the embodiment, the receiving units 1 are piezoelectric sensors, the piezoelectric sensors are used for generating corresponding electrical signals when receiving the acoustic wave signal and sending the electrical signals to the timing unit 2, and the timing unit 2 sequentially receives the electrical signals generated by the piezoelectric sensors and records the corresponding reception times when the receiving units 1 receive the acoustic wave signal according to the received electrical signals. In the embodiment, since the piezoelectric sensors have the characteristics of simple structure, small volume and small mass, they can be conveniently installed in edge areas of the display panel 7. In addition, as the piezoelectric sensors has the characteristic of small power consumption, the overall power consumption of the touch screen can be reduced.

Further, the calculating unit 3 comprises a time coordinate generating module 5 and a calculating module 6, the time coordinate generating module 5 being connected with the calculating module 6. The time coordinate generating module 5 is used for generating a corresponding reception time coordinate of the touch point 9 in an n-dimensional coordinate system according to the reception times of the receiving units 1 recorded by the timing unit 2, and generating corresponding reception time coordinates of the reference positions 8 in the n-dimensional coordinate system according to the corresponding reception times of the receiving units 1 when the reference positions 8 are touched stored in the storage unit 4. The calculating module 6 is used for respectively calculating Euclidean distances between the reference positions 8 and the touch point 9 according to the reception time coordinate of the touch point 9 and the reception time coordinates of the reference positions 8 in the n-dimensional coordinate system, and determining a reference position 8 at a minimum Euclidean distance from the touch point 9, so as to determine the position coordinate of the touch point 9 on the display panel 7 as the position coordinate corresponding to the reference position 8 at the minimum Euclidean distance from the touch point 9.

A detailed illustration of the working principle of the touch screen in the present invention is given below in conjunction with the accompanying drawings. In the embodiment, it is assumed that four receiving units are provided, the display panel 7 has a rectangular shape, and the four receiving units 1a, 1b, 1c, 1d are respectively located at the midpoints of the four sides of the display panel 7. It should be noted that, in the embodiment, one touch point 9 exists on the display panel 7, and the touch point 9 may be overlapped with the reference position 8 and may also be not overlapped with the reference position 8.

The storage unit 4 pre-stores position coordinates (coordinates embodying real positions on the display panel 7) of a plurality of reference positions 8 on the display panel 7 and corresponding reception times of the receiving units 1a, 1b, 1c, 1d when the reference positions 8 are touched, and the pre-storage process of the storage unit 4 will be described below in detail.

At first, the display panel 7 is divided into a plurality of grids in advance, the cross points of the grid lines are used as reference positions 8, and meanwhile corresponding position coordinates of the reference positions 8 are recorded.

It should be noted that the selection of the reference positions 8 in the present invention is not limited to the above-mentioned grid division way, and the reference positions 8 in the present invention can be any positions on the display panel 7.

Then, a reference position 8 is touched by a touch device (for example, a finger, a touch pen and the like), at this time, an acoustic wave signal is generated at the touched reference position 8, and the acoustic wave signal is respectively transmitted to the four receiving units 1a, 1b, 1c, 1d on the edges of the display panel 7. The timing unit 2 is started when any receiving unit 1a, 1b, 1c or 1d in all the receiving units 1a, 1b, 1c, 1d receives the acoustic wave signal, records the corresponding reception time of the receiving unit receiving the acoustic wave signal first as 0, and sequentially records the corresponding reception times of the rest receiving units receiving the acoustic wave signal.

Then, the time coordinate generating module 5 generates a corresponding reception time coordinate (X1, X2, X3, X4) of the reference position 8 in a four-dimensional coordinate system according to the corresponding reception times of the receiving units 1a, 1b, 1c, 1 *d* recorded by the timing unit 2 and a preset arrangement sequence of the receiving units (it is assumed that the arrangement sequence of the four receiving units are sequentially as follows: the receiving unit 1a, the receiving unit 1b, the receiving unit 1c and the receiving unit 1d), wherein X1 is the corresponding reception time of the receiving unit 1a when the reference position 8 is touched, X2 is the corresponding reception time of the receiving unit 1b when the reference position 8 is touched, X3 is the corresponding reception time of the receiving unit 1c when the reference position 8 is touched, and X4 is the corresponding reception time of the receiving unit 1d when the reference position 8 is touched.

It should be noted that since four receiving units 1a, 1b, 1c, 1d are provided in the embodiment, the n-dimensional coordinate system is correspondingly the four-dimensional coordinate system.

Finally, the position coordinates and the reception time coordinates corresponding to the reference positions 8 on the display panel 7 are obtained by adopting the above method, and are stored in the storage unit 4, and so far, the pre-storage process of the storage unit 4 is terminated.

Then, a detailed description of a touch point positioning process is given below.

At first, when the touch device touches any position on the display panel 7, the position is used as the touch point 9, an acoustic wave signal is generated at the touch point 9, and the acoustic wave signal is respectively transmitted to the four receiving units 1a, 1b, 1c, 1d on the edges of the display panel 7. The counting unit 10 counts the number of the receiving units receiving the acoustic wave signal. Specifically, a receiving unit generates a corresponding electrical signal when receiving the acoustic wave signal, and the receiving unit sends the electrical signal to the timing unit 2 while sending the electrical signal to the counting unit 10, and the counting unit 10 counts the number of the receiving unit(s) receiving the acoustic wave signal by calculating the number of the received electrical signal(s). When any receiving unit in all the receiving units 1a, 1b, 1c, 1d receives the acoustic wave signal, the count value in the counting unit 10 is 1, and the counting unit 10 generates and sends a timing start signal to the timing unit 2. The timing unit 2 is started when receiving the timing start signal, records the corresponding reception time of the receiving unit receiving the acoustic wave signal first as 0, and sequentially records the corresponding reception times of the rest receiving units receiving the acoustic wave signal. When all the receiving units 1a, 1b, 1c, 1d receive the acoustic wave signal, the count value in the counting unit 10 is 4, and the counting unit 10 generates and sends a timing termination signal to the timing unit 2, and the counting unit 10 resets the count value. The timing unit 2 is closed when receiving the timing termination signal.

Then, the time coordinate generating module 5 generates a corresponding reception time coordinate (X1', X2', X3', X4') of the touch point 9 in the four-dimensional coordinate system according to corresponding reception times of the receiving units 1a, 1b, 1c, 1d recorded by the timing unit 2 and a preset arrangement sequence of the receiving units (same as the arrangement sequence in the pre-storage process), wherein, X1' is the corresponding reception time when the acoustic wave signal generated at the touch point 9 is received by the receiving unit 1a, X2' is the corresponding reception time when the acoustic wave signal generated at the touch point 9 is received by the receiving unit 1b, X3' is the corresponding reception time when the acoustic wave signal generated at the touch point 9 is received by the receiving unit 1c, and X4' is the corresponding reception time when the acoustic wave signal generated at the touch point 9 is received by the receiving unit 1d.

Finally, the calculating module 6 calculates Euclidean distances D between the reference positions 8 and the touch point 9, wherein $$D=\sqrt{(X1-X1')^2+(X2-X2')^2+(X3-X3')^2+(X4-X4')^2}.$$

A reference position 8 at a minimum Euclidean distance from the touch point 9 is obtained by judgment based on the calculated Euclidean distances between the reference positions 8 and the touch point 9, a position coordinate corresponding to the reference position 8 at the minimum Euclidean distance from the touch point 9 is acquired from the storage unit 4, and the position coordinate is used as the position coordinate of the touch point 9, so far the touch point positioning process is terminated.

It should be noted that in the pre-storage process of the storage unit 4, the storage unit 4 is connected with the timing unit 2, but in the touch point positioning process, storage unit 4 does not need to be connected with the timing unit 2.

In addition, it should be noted that, in the embodiment, the conditions that four receiving units 1 are provided, the display panel 7 has a rectangular shape and the four receiving units 1a, 1b, 1c, 1d are respectively located at the midpoints of the four sides of the display panel 7 are merely exemplary, and not intended to limit the technical solutions of the present application.

In the embodiment, the number of the receiving units 1 is larger than or equal to 3. When the number of the receiving units 1 is 3, the three receiving units 1 cannot be located on a same straight line (no corresponding drawing is given for the case where the number of the receiving units is 3).

It should be noted that, in the embodiment, the touch point positioning precision is related to the number and the distribution of the reference positions 8 on the display panel 7, namely the larger the number of the reference positions 8 or the denser the distribution of the reference positions 8 is, correspondingly, the higher the touch point positioning precision is.

The embodiment provides a touch screen, the touch screen comprises a display panel and a touch point positioning device, the touch point positioning device comprises a timing unit, a calculating unit and n receiving units, the receiving units are provided in edge areas of the display panel, the receiving units are connected with the timing unit, and the timing unit is connected with the calculating unit. According to the technical solutions of the present invention, the receiving units receive an acoustic wave signal generated at a touch point when the display panel is touched, the timing unit records reception times when the receiving units receive the acoustic wave signal, and the calculating unit calculates a position coordinate of the touch point on the display panel according to the reception times of the receiving units recorded by the timing unit, thus achieving positioning of the touch point. In addition, in the embodiment, since the receiving units in the touch screen are provided in the edge areas of the display panel, the arrangement of the receiving units generates no influence on the display effect of the display panel. In addition, when the receiving units are piezoelectric sensors, since the power consumption of the piezoelectric sensors is quite low, the overall power consumption of the display screen will not be increased. Meanwhile, the timing unit in the touch screen can be started when any receiving unit in all the receiving units receives the acoustic wave signal and be closed when all the receiving units receive the acoustic wave signal, so that the overall power consumption of the display screen can be effectively reduced.

Second Embodiment

Figure 3:
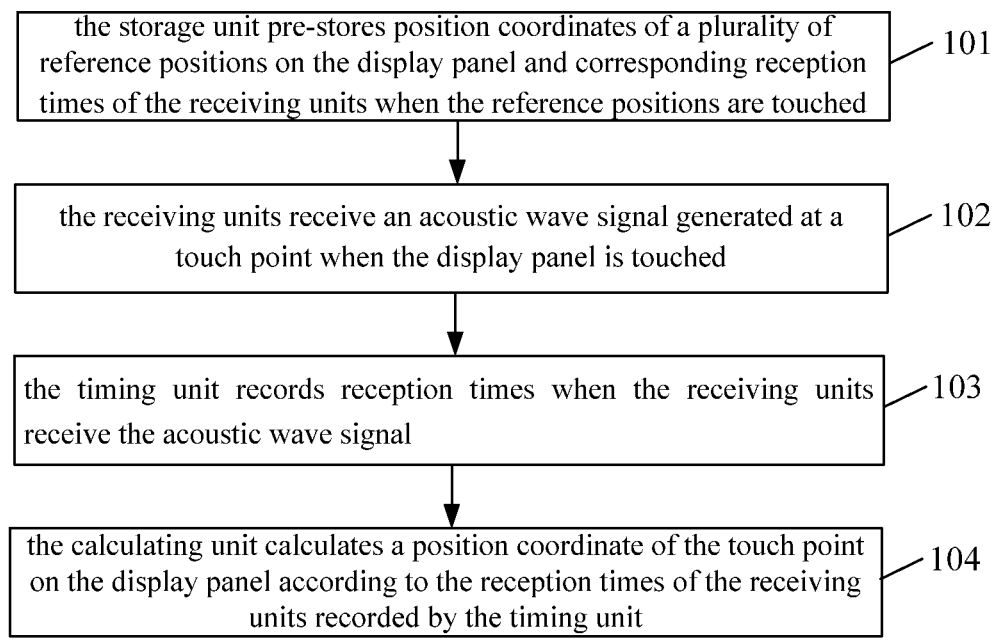
FIG. 3 is a flow chart of a touch point positioning method of a touch screen provided by a second embodiment of the present invention.

FIG. 3 is a flow chart of a touch point positioning method of a touch screen provided by the second embodiment of the present invention. The touch point positioning method is applied to a touch screen, the touch screen comprises a display panel and a touch point positioning device, the touch point positioning device comprises a storage unit, a timing unit, a calculating unit and n receiving units, where n is 3, the receiving units are provided in edge areas of the display panel, the storage unit is connected with the calculating unit, the receiving units are connected with the timing unit, and the timing unit is connected with the calculating unit, the touch point positioning method comprises the following steps 101 to 104.

Step 101: the storage unit pre-stores position coordinates of a plurality of reference positions on the display panel and corresponding reception times of the receiving units when the reference positions are touched. For this process, reference can be made to the descriptions in the above first embodiment, and this will not be repeated herein.

Step 102: the receiving units receive an acoustic wave signal generated at a touch point when the display panel is touched.

In step 102, when the display panel is touched by a touch device, a corresponding acoustic wave signal is generated at the touch point, and the acoustic wave signal will be received by the n receiving units provided in edge areas of the display panel.

Step 103: the timing unit records reception times when the receiving units receive the acoustic wave signal.

In step 103, the timing unit is started when any receiving unit in all the receiving units receives the acoustic wave signal, records the corresponding reception time of the receiving unit receiving the acoustic wave signal first as a 0, and then sequentially records the corresponding reception times of the rest receiving units receiving the acoustic wave signal, and the timing unit is closed when all the receiving units receive the acoustic wave signal.

Step 104: the calculating unit calculates a position coordinate of the touch point on the display panel according to the reception times of the receiving units recorded by the timing unit.

In step 104, optionally, the calculating unit comprises a time coordinate generating module and a calculating module, the time coordinate generating module being connected with the calculating module.

Specifically, step 104 can comprise the following sub-steps 1041 to 1042.

Step 1041: the time coordinate generating module generates a corresponding reception time coordinate of the touch point in an n-dimensional coordinate system according to the reception times of the receiving units recorded by the timing unit, and generates corresponding reception time coordinates of the reference positions in the n-dimensional coordinate system according to the corresponding reception times of the receiving units when the reference positions are touched stored in the storage unit.

Step 1042: the calculating module calculates Euclidean distances between the reference positions and the touch point according to the reception time coordinate of the touch point and the reception time coordinates of the reference positions in the n-dimensional coordinate system, and determines a reference position at a minimum Euclidean distance from the touch point, so as to determine the position coordinate of the touch point on the display panel as the position coordinate corresponding to the reference position at the minimum Euclidean distance from the touch point.

The second embodiment of the present invention provides a touch point positioning method. The positioning method comprises: receiving, by the receiving units, an acoustic wave signal generated at a touch point when the display panel is touched; recording, by the timing unit, reception times when the receiving units receive the acoustic wave signal; calculating, by the calculating unit, a position coordinate of the touch point on the display panel according to the reception times of the receiving units recorded by the timing unit. Based on the above-mentioned steps, the technical solutions of the present invention can implement positioning of the touch point on the display panel.

It can be understood that, the foregoing embodiments are merely exemplary embodiments used for illustrating the principle of the present invention, but the present invention is not limited thereto. Those of ordinary skill in the art can make various variations and improvements without departing from the spirit and essence of the present invention, and these variations and improvements shall fall within the protection scope of the present invention.

The invention claimed is:

1. A touch screen, comprising a display panel and a touch point positioning device, the touch point positioning device comprising a timing unit, a calculating unit and n receiving units, where n≥3, wherein the receiving units are provided in edge areas of the display panel, and the receiving units are used for receiving an acoustic wave signal generated at a touch point when the display panel is touched;

the timing unit is used for recording reception times when the receiving units receive the acoustic wave signal; and the calculating unit is used for calculating a position coordinate of the touch point on the display panel according to the reception times of the receiving units recorded by the timing unit; wherein the positioning device further comprises a storage unit, the storage unit is used for pre-storing position coordinates of a plurality of reference positions on the display panel and corresponding reception times of the receiving units when the reference positions are touched, the calculating unit comprises a time coordinate generating module and a calculating module, the time coordinate generating module is used for generating a corresponding reception time coordinate of the touch point in an n-dimensional coordinate system according to the reception times of the receiving units recorded by the timing unit and according to a preset arrangement sequence of the receiving units, and generating corresponding reception time coordinates of the reference positions in the n-dimensional coordinate system according to the corresponding reception times of the receiving units when the reference positions are touched stored in the storage unit and according to the preset arrangement sequence of the receiving units; and the calculating module is used for respectively calculating Euclidean distances between the reference positions and the touch point according to the reception time coordinate of the touch point and the reception time coordinates of the reference positions in the n-dimensional coordinate system, and determining a reference position at a minimum Euclidean distance from the touch point, so as to determine the position coordinate of the touch point on the display panel as the position coordinate corresponding to the reference position at the minimum Euclidean distance from the touch point.

2. The touch screen of claim 1, wherein the timing unit is started when any receiving unit in all the receiving units receives the acoustic wave signal, is stopped when all the receiving units receive the acoustic wave signal, and records the corresponding reception time of the receiving unit receiving the acoustic wave signal first as an initial time.

3. The touch screen of claim 2, wherein the touch point positioning device further comprises a counting unit, the counting unit is used for counting the number of the receiving unit(s) receiving the acoustic wave signal; when the count value in the counting unit is 1, the counting unit generates and sends a timing start signal to the timing unit, and when the count value in the counting unit is n, the counting unit generates and sends a timing termination signal to the timing unit, and the counting unit resets the count value, the timing unit is started when receiving the timing start signal and is stopped when receiving the timing termination signal.

4. The touch screen of claim 1, wherein the receiving units are piezoelectric sensors, the piezoelectric sensors are used for generating corresponding electrical signals when receiving the acoustic wave signal, and sending the electrical signals to the timing unit, and the timing unit sequentially receives the electrical signals generated by the piezoelectric sensors and records the corresponding reception times of the receiving units receiving the acoustic wave signal according to the received electrical signals.

5. The touch screen of claim 1, wherein the touch point positioning device comprises three receiving units, and the three receiving units are not located on a same straight line.

6. The touch screen of claim 1, wherein the touch point positioning device comprises four receiving units, the display panel has a rectangular shape, and the four receiving units are respectively located at midpoints of four sides of the display panel.

7. A touch point positioning method of a touch screen, the touch screen comprising a display panel and a touch point positioning device, the touch point positioning device comprising a timing unit, a calculating unit and n receiving units, where n 3, the receiving units being provided in edge areas of the display panel, the touch point positioning method comprising steps of:

receiving, by the receiving units, an acoustic wave signal generated at a touch point when the display panel is touched;

recording, by the timing unit, reception times when the receiving units receive the acoustic wave signal; and calculating, by the calculating unit, a position coordinate of the touch point on the display panel according to the reception times of the receiving units recorded by the timing unit; wherein the touch point positioning device further comprises a storage unit, and prior to the step of receiving, by the receiving units, an acoustic wave signal generated at a touch point when the display panel is touched, the touch point positioning method further comprises:

pre-storing by the storage unit, position coordinates of a plurality of reference positions on the display panel and corresponding reception times of the receiving units when the reference positions are touched, the calculating unit comprises a time coordinate generating module and a calculating module, and the step of calculating, by the calculating unit, the position coordinate of the touch point on the display panel according to the reception times of the receiving units recorded by the timing unit comprises:

generating, by the time coordinate generating module, a corresponding reception time coordinate of the touch point in an n-dimensional coordinate system according to the reception times of the receiving units recorded by the timing unit and according to a preset arrangement sequence of the receiving units, and generating corresponding reception time coordinates of the reference positions in the n-dimensional coordinate system according to the corresponding reception times of the receiving units when the reference positions are touched stored in the storage unit and according to the preset arrangement sequence of the receiving units; and respectively calculating Euclidean distances between the reference positions and the touch point according to the reception time coordinate of the touch point and the reception time coordinates of the reference positions in the n-dimensional coordinate system, and determining a reference position at a minimum Euclidean distance from the touch point, by the calculating module, so as to determine the position coordinate of the touch point on the display panel as the position coordinate corresponding to the reference position at the minimum Euclidean distance from the touch point.

8. The touch point positioning method of the touch screen of claim 7, wherein the timing unit is started when any receiving unit in all the receiving units receives the acoustic wave signal, is stopped when all the receiving units receive the acoustic wave signal, and records the corresponding reception time of the receiving unit receiving the acoustic wave signal first as an initial time.

* * * * *